United States Patent
Moore

(10) Patent No.: US 6,363,781 B1
(45) Date of Patent: Apr. 2, 2002

(54) DYNAMIC RAIN GAUGE ASSEMBLY

(76) Inventor: David G. Moore, 5965 Artist Bay Rd., West Bend, WI (US) 53095

(*) Notice: Subject to any disclaimer, the term of this patent is extended or adjusted under 35 U.S.C. 154(b) by 0 days.

(21) Appl. No.: 09/523,008

(22) Filed: Mar. 10, 2000

(51) Int. Cl.[7] .............................................. G01W 1/00
(52) U.S. Cl. ................................................... 73/170.17
(58) Field of Search ......................... 73/170.17, 170.18, 73/170.19, 170.21, 170.22, 170.23, 456, 467, 469; 116/227, 276

(56) References Cited

U.S. PATENT DOCUMENTS

| | | | | |
|---|---|---|---|---|
| 1,118,259 A | * | 11/1914 | Beard | 73/170.17 |
| 1,153,355 A | * | 9/1915 | Tredway | 73/170.17 |
| 2,509,522 A | * | 5/1950 | Phillips | 73/170.17 |
| 2,520,557 A | * | 8/1950 | Moore | 73/170.17 |
| 3,826,135 A | | 7/1974 | Hollmann | |
| 5,531,114 A | | 7/1996 | Frager | |

* cited by examiner

Primary Examiner—Benjamin R. Fuller
Assistant Examiner—Abdullahi Aw-Musse
(74) Attorney, Agent, or Firm—Joesph S. Heino

(57) ABSTRACT

A rain gauge assembly has a collection cylinder situated within a vertical support housing. The lowermost portion of the collection cylinder comes to a point which rests upon the bottommost surface of the support housing. The uppermost portion of the collection cylinder is supported by the uppermost portion of the support housing. Connected to the uppermost portion of the collection cylinder is a flexible connector which is connected to a collector and a collector funnel. Affixed to the collector is a wind deflector support arm. The wind deflector support arm is attached to a vertical deflecting fin and a horizontal deflecting fin. The vertical and horizontal fins are situated in perpendicular planes for reacting to both wind direction and wind velocity, respectively.

12 Claims, 2 Drawing Sheets

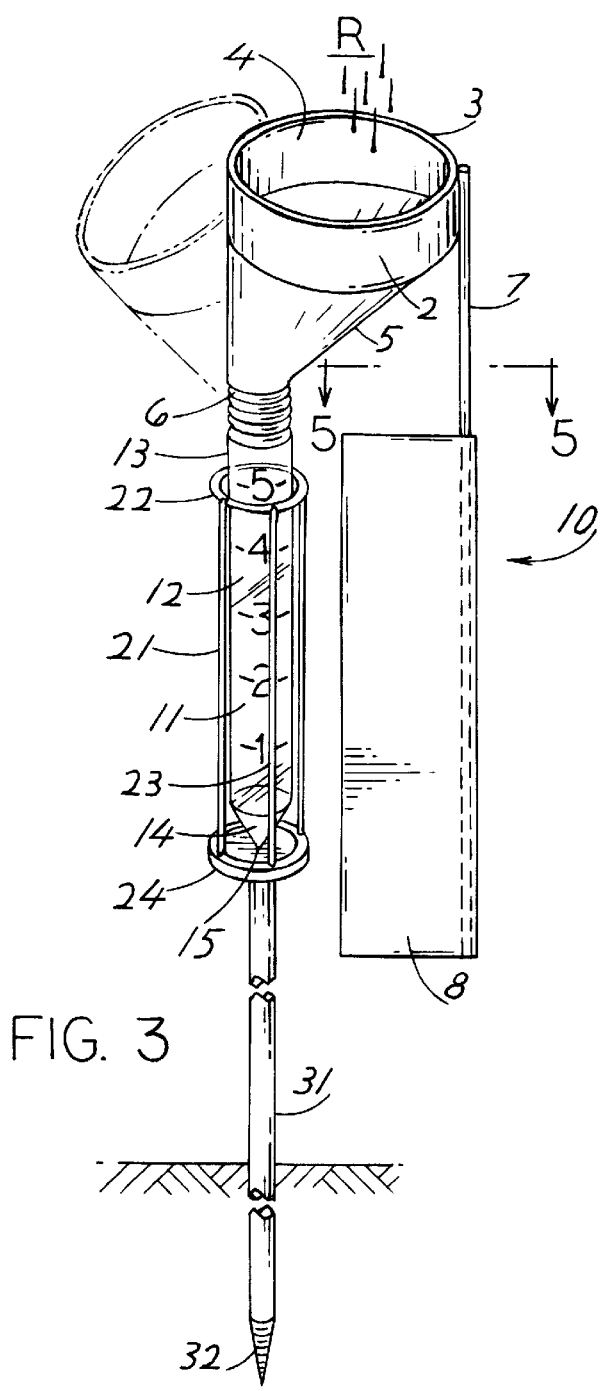
FIG. 3
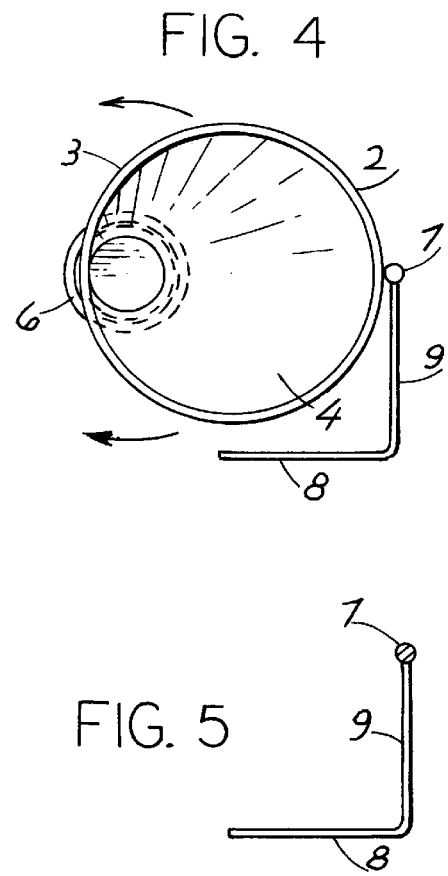
FIG. 4
FIG. 5
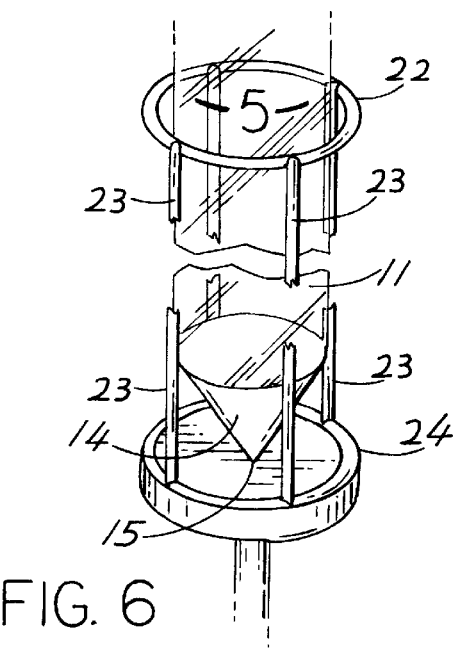
FIG. 6

DYNAMIC RAIN GAUGE ASSEMBLY

FIELD OF THE INVENTION

This invention relates to rain gauges. More particularly, it relates to a dynamic rain gauge assembly which is responsive to the velocity and direction of rain fall such that the rain gauge assembly is capable of accurately collecting and measuring rain fall under dynamic weather conditions.

BACKGROUND OF THE INVENTION

Rain gauges have long been used as part of man's attempt to analyze and understand his environment. The most common form of rain gauge currently available is a graduated clear plastic or glass tube or cylinder which, when placed outdoors, does a fairly decent job of measuring rain fall. In fact, the clear plastic or glass graduated cylinder is very accurate in its measurement when rain fall is fairly perpendicular to the earth or ground. But because rain fall is typically the result of violent weather conditions in which the wind is blowing and the rain is driving in any direction but straight downwardly, the clear plastic or glass cylinder becomes quite inadequate for its intended purpose. Under those conditions, which can be quite dynamic, the driving wind and the concomitant rain comes from different directions and at different angles relative to the perpendicular. This rain, which is driven by the speed and direction of the wind, can also quickly and suddenly change directions under storm conditions. Under those storm conditions, the typical rain gauge is a very inaccurate way to measure rain fall. The reason for this is that the rain, when analyzed from a cross section of the dynamic perpendicular direction in which it falls, typically sees a circular opening to the rain collecting cylinder. To the contrary, the rain falling at a substantial angle to the perpendicular sees the circular opening to the graduated cylinder as anything but a perfect circle. Instead, it sees an ellipse. And the greater the angle at which the rain is being driven, the greater is this elliptical effect. That is, the square area of the ellipse as seen by the driving rain is proportionately smaller than the square area of the circular opening of the graduated cylinder as the angle relative to the perpendicular becomes greater.

A number of devices have been constructed in an attempt to take a rain gauge-like device and somehow try to keep it pointed in the direction of the driving rain. And they attempt to do this while the rain gauge-like device is filling the device. See, for example, U.S. Pat. No. 5,531,114 issued to Frager and U.S. Pat. No. 3,826,135 issued to Hollmann. In the experience of this inventor, such devices have a fundamental problem. As the rain gauge begins to fill, it is doomed to fail as an accurate measuring device because the weight of the rain which is collected tends to weigh down and defeat the wind direction devices which are also incorporated in those devices. Also in the experience of this inventor, it is critical to the accurate performance of the device to separate the rain collecting and the wind reacting elements of the device from one another. Accordingly, it is an object of this invention to provide a rain gauge assembly which accurately collects and measures rain fall regardless of the direction or velocity of the driving rain. It is another object of this invention to provide such an assembly which separates the rain collecting and the wind collecting elements of the assembly. It is yet another object of this invention to provide a rain gauge assembly which utilizes a minimal number of elements to accomplish the intended result. It is still another object to provide such an assembly which is easy to assemble and use.

SUMMARY OF THE INVENTION

The present invention has obtained these objects. It provides for a rain gauge assembly having a collection cylinder situated within a vertical support housing. The lowermost portion of the collection cylinder comes to a point which rests upon the bottommost surface of the support housing. The uppermost portion of the collection cylinder is supported by the uppermost portion of the support housing. Connected to the uppermost portion of the collection cylinder is a flexible connector which is, in turn, connected to a collector and a collector funnel. Affixed to the collector is a wind deflector support arm. The wind deflector support arm is attached to a vertical deflecting fin and a horizontal deflecting fin. The vertical and horizontal fins are situated in perpendicular planes for reacting to both wind direction and wind velocity, respectively. The foregoing and other features of the present invention will be further apparent from the detailed description which follows.

BRIEF DESCRIPTION OF THE DRAWINGS

FIG. 3 is a right side perspective view of the rain gauge assembly shown in FIG. 1 and showing the assembly in a vertical rain fall non-wind condition.

FIG. 4 is a top plan view of the rain gauge assembly under the conditions shown in FIG. 3.

FIG. 5 is a top plan view of the wind deflecting fin portion of the assembly also shown under the conditions depicted in FIG. 3 and taken along line 5—5 thereof.

FIG. 6 is an enlarged right side perspective view of the means utilized to retain the assembly cylinder within the housing and allow it to rotate therewithin.

DETAILED DESCRIPTION

Figure 1:
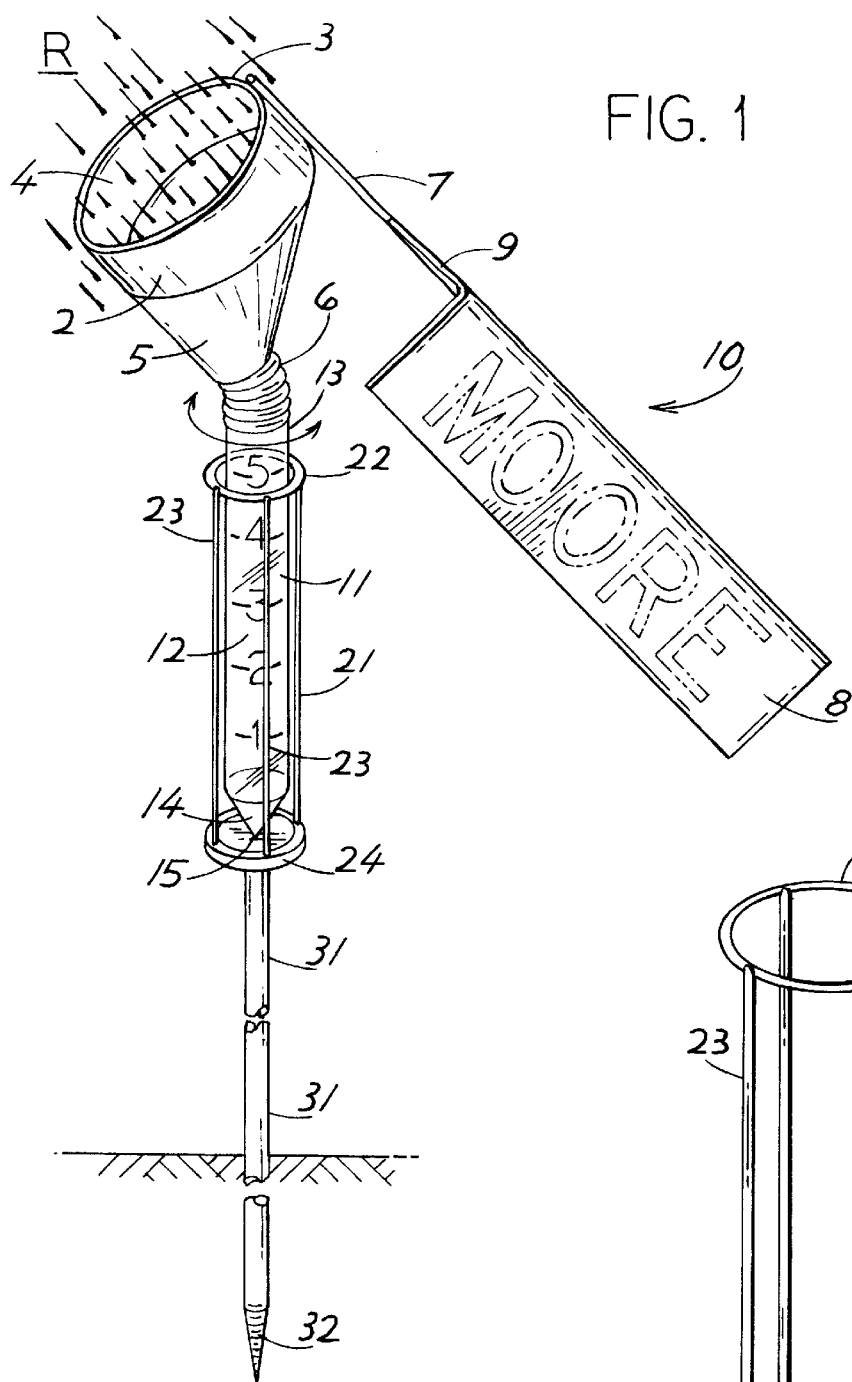
FIG. 1 is a right side perspective view of a rain gauge assembly constructed in accordance with the present invention and showing the assembly as it would appear in a non-vertical driving rain storm condition.
Figure 2:
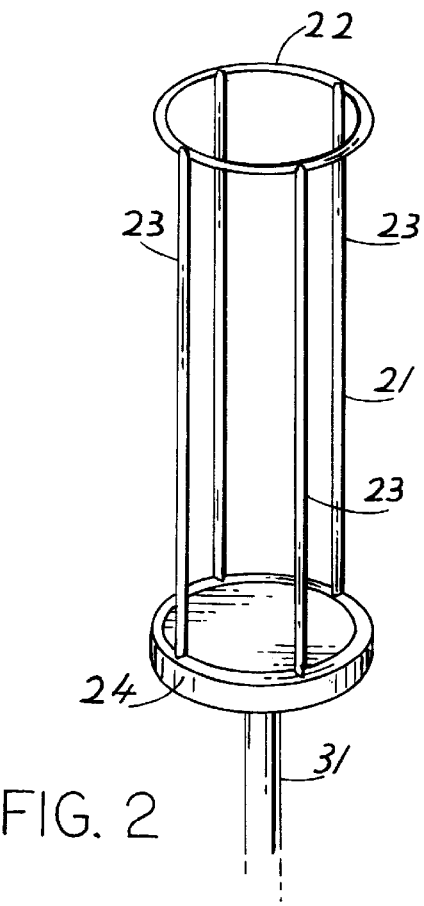
FIG. 2 is an enlarged view of the housing portion of the assembly shown in FIG. 1.

Referring now to the drawings in detail, FIG. 1 illustrates a dynamic rain gauge assembly, generally identified 10, constructed in accordance with the present invention. The rain gauge assembly 10 includes a rain collection cylinder 11. The rain collection cylinder 11 contains indicia or markings 12 which indicate the amount of rain fall in inches or centimeters, as such is desired or required. The collection cylinder 11 is retained in a generally vertical position by virtue of a support housing 21. The support housing 21 includes a support housing base portion 24 and a top ring portion 22. See FIG. 2. The top ring portion 22 of the support housing 21 is maintained in position by virtue of a plurality of vertical posts 23. The vertical posts 23 are spaced such that the cylinder indicia 12 of the collection cylinder 11 are clearly visible through the support housing 21. In the preferred embodiment, there are four such vertical posts 23 utilized in the support housing 21. It is possible, however, to obtain the result of this invention by utilizing a support housing 21 which has a lesser number of vertical posts 23. The number of vertical posts 23 is not a limitation of the invention. The collection cylinder 11 is functionally adapted to freely rotate within the confines of the support housing 21. The uppermost portion 13 of the collect cylinder 11 rotates within the top ring portion 22 of the support housing 21. The lowermost portion of the collection cylinder 11 utilizes a cylinder cone 14 which comes to a point 15. See FIG. 6. The collection cylinder point 15 rests upon and is supported by the support housing portion 24. In this fashion, minimal frictional forces are experienced by the collection cylinder 11 as it rotates freely within the support housing 21. Although it is shown that the support housing 21 is attached to a support post 31 and an end screw 32, it is to be understood that the support housing 21 could be mounted in any number of fashions and to any number of generally horizontal surfaces. Mounting of the support housing 21 to any particular surface is not a limitation of the invention.

The upper portion 13 of the collection cylinder 11 is attached to a flexible connecter 6. The flexible connecter 6, in turn, is connected to a collector funnel 5. The collector funnel 5 is, in turn, is connected to a cylindrical rain collector 2. The face 3 of the collector 2 is, by virtue of the construction of the present invention, intended to always present itself perpendicularly to the direction of the falling or driving rain R. The collector 2 utilizes a collector aperture 4 for collection of the falling or driving rain R. Rearwardly of, and affixed to, the collector 2 is a wind deflector support arm 7. The wind deflector support arm 7, in turn, is attached to a horizontal deflecting fin 9 and vertical deflecting fin 8. See FIGS. 4 and 5.

The vertical deflecting fin 8 is functionally adapted to react to wind direction such that the collector face 3 rotates the collection cylinder 11 to always point the collector aperture 4 in the direction of the driving rain R. The horizontal deflecting fin 9 similarly reacts to the wind velocity by lifting the horizontal deflecting fin 9 thereby pushing the collector 2 downwardly toward the horizontal. In its most simplistic terms, the greater the wind force exerted upon the horizontal deflecting fin 9, the greater the amount that the collector face 3 will be tilted away from the vertical. As wind velocity drops, the forces exerted upon the horizontal deflecting fin 9 will lessen and the collector face 3 will raise to a generally perpendicular plane relative to the vertical.

In addition to the functional features of the deflecting fins 8, 9, each fin may also double as an advertising medium. The fins 8, 9 may bear the names or logos of sponsors, promoters or other novel decorative elements as such may be desired or required.

From the foregoing detailed description of the present invention, it will be apparent that there has been provided a rain gauge assembly which accurately collects and measures rain fall regardless of the direction or velocity of the driving rain; which separates the rain collecting and the wind reacting elements of the assembly from one another; which utilizes a minimal number of elements to accomplish the intended result; and which is easy to assemble and use.

The principles of this invention having been fully explained in connection with the foregoing, I claim:

1. A rain gauge assembly comprised of
    a rain collection cylinder,
    a collection cylinder housing, said housing being configured to cooperatively receive and support the rain collection cylinder within said cylinder housing,
    means for rotating said rain collection cylinder within said housing,
    a substantially circular rain collector, said rain collector having an aperture and being flexibly attached to said rain collection cylinder, and
    means for presenting said rain collector aperture in rain collecting relationship to falling or driving rain, said presenting means and said cylinder rotating means each being attached to said rain collector.

2. The rain gauge assembly of claim 1 wherein said rain collector aperture presenting means includes a deflecting fin support rod being attached to and extending downwardly from said rain collector, said deflecting fin support rod including a pair of wind deflecting fins attached to it.

3. The rain gauge assembly of claim 2 wherein said deflecting fins are positioned at a 90° angle to one another whereby one deflecting fin reacts to wind direction to rotate said collection cylinder within said housing and the other deflecting fin reacts to wind velocity to present said rain collector aperture in rain collecting relation to falling or driving rain.

4. The rain gauge assembly of claim 3 wherein said collection cylinder includes a bottommost portion and said collection cylinder rotating means further includes a pivot point situated at the bottommost portion of said collection cylinder.

5. A rain gauge assembly comprised of
    a rain collecting cylinder, said cylinder being made of a light transparent material and including indicia for measuring the collected contents of the cylinder,
    a cylinder housing, said housing supporting and retaining the rain collecting cylinder within said cylinder housing,
    a rain collector, said rain collector having an aperture whereby said aperture receives falling rain,
    means for flexibly connecting said rain collector to said cylinder,
    means for rotating said rain collection cylinder within said housing, said rotating means including a pivot point situated at the base of said cylinder and a first wind deflecting fin attached to said rain collector to rotate the rain collection cylinder about the housing, and
    means for tilting said rain collector and aperture in the direction of falling or driving rain, said rain collector tilting means including a second wind deflecting fin attached to said rain collector to tilt the rain collector in the direction of falling or driving rain.

6. The rain gauge assembly of claim 5 wherein said first and second wind deflecting fins are attached to a common support member, said common support member being attached to said rain collector.

7. The rain gauge assembly of claim 6 wherein said first and second wind deflecting fins are disposed at a 90° angle to one another.

8. A rain gauge assembly comprising
    a rain collector, said rain collection aperture having a top portion which forms an opening for collecting rain and having a tapered bottom portion,
    a rain collection container, said rain collection container having an open top portion and a closed bottom portion,
    a flexible connector, said flexible connector having a first end and a second end, said first connector end being affixed to the top portion of said rain collection container and said second connector end being affixed to the bottom portion of said rain collector,
    a generally flat platform member, said platform member being situated in a generally horizontal plane,
    a frame extending upwardly from said platform member, said frame being configured to fit around said rain collection container with a plurality of supports extending upwardly from said platform to the top portion of said rain collection container and to support said rain collection container tightly enough so that said rain collection container is in a vertical position but loosely enough so that said rain collection container may rotate freely within said frame, and
    means for moving said rain collector into the direction of falling rain, said aperture moving means being attached to said rain collector.

9. The rain gauge assembly of claim 8 wherein said rain collection cylinder is constructed of a transparent material.

10. The rain gauge assembly of claim 9 wherein said rain collection cylinder has suitable measurement graduations.

11. The rain gauge assembly of claim 10 wherein said means for moving said rain collection aperture includes a wind indicator affixed to said rain collection aperture, said indicator including at least one horizontal fin to position the rain collection aperture according to wind speed and at least one vertical fin to position said rain collection aperture according to wind direction.

12. The rain gauge assembly of claim 11 wherein said flexible connector is constructed such that it can bend up to 90° relative to the vertical.

* * * * *